(12) United States Patent
Ramsharan et al.

(10) Patent No.: US 12,461,892 B2
(45) Date of Patent: *Nov. 4, 2025

(54) DATA DELETION SYSTEM AND METHOD

(71) Applicant: Palantir Technologies Inc., Denver, CO (US)

(72) Inventors: Rahij Ramsharan, London (GB); Alexis Daboville, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,518

(22) Filed: Apr. 22, 2024

(65) Prior Publication Data

US 2024/0273062 A1 Aug. 15, 2024

Related U.S. Application Data

(63) Continuation of application No. 17/022,370, filed on Sep. 16, 2020, now Pat. No. 11,995,033.

(30) Foreign Application Priority Data

Sep. 16, 2019 (GB) .................................. 1913348

(51) Int. Cl.
*G06F 16/11* (2019.01)
*G06F 16/16* (2019.01)
*G06F 16/215* (2019.01)

(52) U.S. Cl.
CPC .......... *G06F 16/125* (2019.01); *G06F 16/162* (2019.01); *G06F 16/215* (2019.01)

(58) Field of Classification Search
CPC ..... G06F 16/125; G06F 16/162; G06F 16/215
See application file for complete search history.

(56) References Cited

U.S. PATENT DOCUMENTS

| | | | |
|---|---|---|---|
| 6,988,093 B2* | 1/2006 | Pic | G06F 16/40 |
| 7,107,416 B2* | 9/2006 | Stuart | G06F 16/185 |
| | | | 711/134 |
| 7,751,628 B1* | 7/2010 | Reisman | H04N 21/440227 |
| | | | 382/232 |
| 8,700,576 B2* | 4/2014 | Stakutis | G06F 16/125 |
| | | | 707/662 |
| 9,002,805 B1* | 4/2015 | Barber | G06F 16/215 |
| | | | 707/692 |
| 9,361,243 B2* | 6/2016 | Shaath | G06F 16/176 |
| 9,417,917 B1* | 8/2016 | Barber | G06F 9/5005 |
| 9,639,589 B1* | 5/2017 | Theimer | G06F 21/00 |

(Continued)

FOREIGN PATENT DOCUMENTS

| | | |
|---|---|---|
| EP | 3792780 | 3/2021 |
| WO | WO 2017/187311 | 11/2017 |

OTHER PUBLICATIONS

European Patent Office, European Search Report prepared Feb. 1, 2021, for U.S. Appl. No. 20/196,419.

*Primary Examiner* — Mark E Hershley
(74) *Attorney, Agent, or Firm* — Faegre Drinker Biddle & Reath LLP

(57) ABSTRACT

Apparatus and methods receive input descriptive of a retention policy; evaluate one or more datasets against the retention policy to determine one or more deletable data elements in the one or more datasets; and delete the one or more deletable data elements from a data store.

20 Claims, 6 Drawing Sheets

(56) References Cited

U.S. PATENT DOCUMENTS

| | | | |
|---|---|---|---|
| 9,912,752 B1* | 3/2018 | Davis | G06F 16/2365 |
| 10,108,690 B1* | 10/2018 | Murray | G06F 16/278 |
| 10,176,182 B2* | 1/2019 | Adam | G06F 16/128 |
| 10,459,883 B1* | 10/2019 | Meiri | G06F 11/2097 |
| 10,474,656 B1* | 11/2019 | Bronnikov | G06F 16/217 |
| 10,496,672 B2 | 12/2019 | Meiri et al. | |
| 10,725,965 B1* | 7/2020 | Rokicki | G06F 16/00 |
| 10,740,287 B2* | 8/2020 | Haviv | G06F 3/0685 |
| 10,976,950 B1* | 4/2021 | Trezzo | G06F 3/0652 |
| 11,068,162 B1* | 7/2021 | Meister | G06F 3/0652 |
| 11,397,674 B1* | 7/2022 | Jiang | G06F 3/067 |
| 11,995,033 B2* | 5/2024 | Ramsharan | G06F 16/162 |
| 2004/0167934 A1* | 8/2004 | Margolus | G06F 16/2358 |
| 2005/0055519 A1* | 3/2005 | Stuart | G06F 16/122 711/159 |
| 2005/0188163 A1* | 8/2005 | Asthana | G06F 8/62 711/170 |
| 2007/0113289 A1* | 5/2007 | Blumenau | G06Q 10/06 707/999.102 |
| 2007/0130127 A1 | 6/2007 | Passmore et al. | |
| 2007/0156727 A1* | 7/2007 | Lim | G06F 16/122 |
| 2007/0266032 A1* | 11/2007 | Blumenau | G06F 16/182 |
| 2008/0282045 A1* | 11/2008 | Biswas | G11C 29/76 711/159 |
| 2010/0088528 A1* | 4/2010 | Sion | G06F 16/125 713/193 |
| 2012/0158669 A1* | 6/2012 | Morsi | G06F 16/125 707/689 |
| 2014/0330800 A1* | 11/2014 | Shaath | G06F 16/125 707/694 |
| 2014/0351201 A1* | 11/2014 | Hobart | G06F 16/125 707/603 |
| 2015/0134626 A1* | 5/2015 | Theimer | G06F 11/3055 707/693 |
| 2015/0310025 A1* | 10/2015 | Rathgeber | G06F 16/125 707/662 |
| 2017/0090980 A1* | 3/2017 | Martin | G06F 9/5066 |
| 2017/0212915 A1* | 7/2017 | Borate | G06F 11/1448 |
| 2017/0262443 A1* | 9/2017 | Cho | G06F 16/192 |
| 2017/0293530 A1* | 10/2017 | Brodt | G06F 16/2365 |
| 2018/0253218 A1* | 9/2018 | Levesque | G06F 16/9038 |
| 2018/0276223 A1* | 9/2018 | Dhanasekaran | G06F 16/125 |
| 2018/0276232 A1* | 9/2018 | Dhanasekaran | G06F 16/25 |
| 2019/0057101 A1* | 2/2019 | Esserlieu | G06F 3/0604 |
| 2019/0087432 A1* | 3/2019 | Sion | G06F 21/6218 |
| 2019/0163625 A1* | 5/2019 | Koo | G06F 11/14 |
| 2019/0272335 A1* | 9/2019 | Liu | G06F 16/21 |
| 2019/0377815 A1* | 12/2019 | Karlberg | G06F 16/22 |
| 2020/0019332 A1* | 1/2020 | Danilov | G06F 11/1076 |
| 2021/0243150 A1* | 8/2021 | Vasamsetti | H04L 12/185 |
| 2024/0273062 A1* | 8/2024 | Ramsharan | G06F 16/162 |

* cited by examiner

DATA DELETION SYSTEM AND METHOD

CROSS REFERENCE TO RELATED APPLICATIONS

This application is a continuation of U.S. patent application Ser. No. 17/022,370, filed on Sep. 16, 2020, which claims priority to UK Patent Application No. 1913348.7, entitled "Data Deletion System and Method" filed on Sep. 16, 2019, both of which are incorporated by reference herein for all purposes.

TECHNICAL FIELD

The present disclosure relates to systems and methods for deleting data.

BACKGROUND

Many data processing systems continuously produce data. However, data storage is not infinite. Even where available data storage is practically very large, e.g. in cloud data storage service, there are costs associated with increased data storage. Therefore, it is desirable to delete unwanted data. Data may be deleted manually by users or using ad-hoc scripts but these data deletion methods entail a substantial risk of deleting important data. Furthermore, when the deletion of large quantities of data is attempted using these data deletion methods, substantial demands may be made on the computational resources of the relevant system(s), potentially resulting in the failure of the relevant system(s)

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

According to a first aspect of the specification, there is provided a method, performed by one or more processors including: receiving input descriptive of a retention policy; evaluating one or more datasets against the retention policy to determine one or more deletable data elements in the one or more datasets; and deleting the one or more deletable data elements from a data store.

The input descriptive of the retention policy may include policy expression language code.

Evaluating the dataset against the retention policy may include selecting a first one or more data elements from one or more datasets using a first part of policy expression language code. Evaluating the dataset against the retention policy may also include selecting a second one or more data elements from the first one or more data elements using a second part of the policy expression language code. The one or more deletable data elements may be a subset of the second one or more data elements. The first part of the policy expression language code may include one or more dataset selectors. The second part of the policy expression language code may include one or more transaction selectors.

Deleting the one or more data elements may include associating a marked property with each of the one or more deletable data elements, wherein the marked property indicates that the respective data element is deletable. Deleting the one or more deletable data elements may further include, subsequent to the associating, deleting, from the data store, a plurality of marked data elements. The plurality of marked data elements may be associated with the marked property. The plurality of marked data elements may include the one or more deletable data elements.

Deleting the plurality of marked data elements may include, for each partition of a plurality of partitions of the data store, deleting, from the partition, a respective set of one or more marked data elements of the plurality of marked data elements. The respective set of one or more marked data elements may be stored on the partition prior to deletion.

Each of the sets of one or more marked data elements may be constrained from including more than a maximum number of data elements.

For each partition of the plurality of partitions of the data store, the respective set of one or more marked data elements may be the largest one or more marked data elements stored in the partition.

For each partition of the plurality of partitions, the largest one or more marked data elements stored in the partition may be determined by, for each marked data element of the one or more marked data elements stored in the partition, adding, to a sorted collection data structure, an identifier of the marked data element in association with an indication of the size of the marked data element. The sorted collection data structure may be a tree set.

Deleting the plurality of marked data elements may use a plurality of coroutines.

Deleting the one or more deletable data elements may include attempting a deletion of a data element of the one or more deletable data elements. Deleting the one or more deletable data elements may further include, in response to not receiving, within a first certain time period after attempting the deletion, a message indicating the success of the deletion, reattempting the deletion of the data element. Deleting the one or more deletable data elements may further include, prior to attempting the deletion of the data element, adding an identifier of the data element to a collection data structure. Deleting the one or more deletable data elements may further include, subsequent to reattempting the deletion, receiving a message within a second certain time period after reattempting the deletion and removing the identifier of the data element from the list. The second certain time period may be of an equal length to the first certain time period.

Deleting data elements from the data store may be an idempotent operation.

According to a second aspect, there is provided a computer program, optionally stored on a non-transitory computer readable medium, which, when executed by one or more processors of a data processing apparatus cause the data processing apparatus to carry out any of the above methods.

According to a third aspect, there is provided an apparatus configured to carry out any of the above methods. The apparatus includes one or more processors.

According to a fourth aspect, there is provided a system including the apparatus of the third aspect and a client computing device. The apparatus is further configured to send, to the client computing device, operational information associated with the deletion of the one or more deletable data elements.

The client computing device may be configured to display a graphical user interface. The graphical user interface may include one or more user interface elements representing the operational information.

BRIEF DESCRIPTION OF THE DRAWINGS

The features of the subject innovations are set forth in the appended claims. However, for purpose of explanation, several aspects of the disclosed subject matter are:

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Computer System

Figure 1:
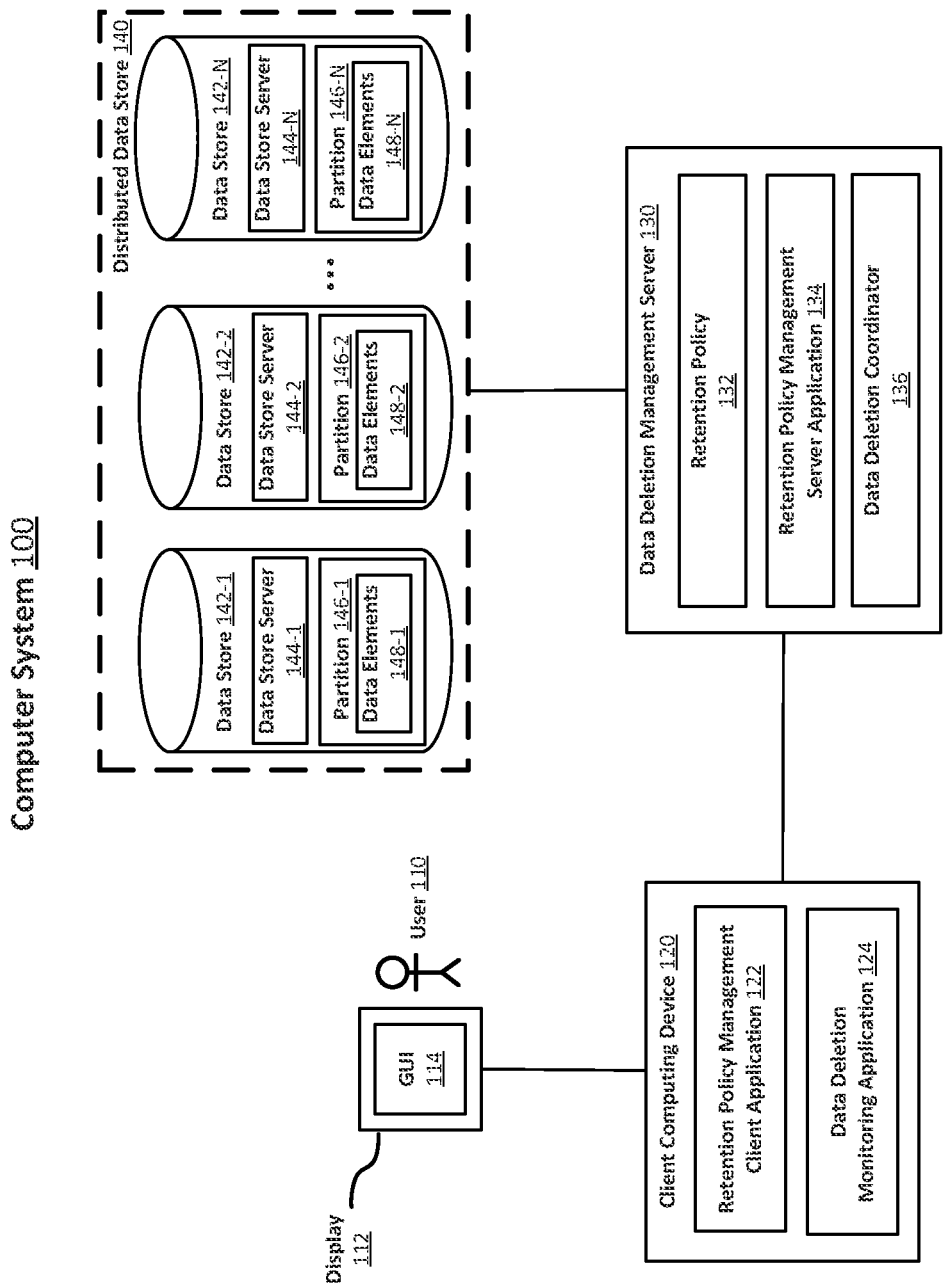
FIG. 1 is a block diagram illustrating an example of a computer system configured to facilitate the deletion of data elements from a data store, in accordance with example embodiments.

FIG. 1 illustrates a computer system 100 configured to facilitate the deletion of data elements from a data store. As shown, the computer system 100 includes a client computing device 120 used by a human user 110, a data deletion management server 130 and a distributed data store 140. The client computing device 120 and the data deletion management server 130 may be configured to communicate with one another via a network (not shown). The network may include the Internet, an intranet, a local area network, a wide area network, a wired network, a wireless network, a virtual private network (VPN), and/or any combination of such networks, whether wireless or wired. For ease of understanding, various components of the system have each been described with reference to one or more computing devices. It should be noted that, in some embodiments, any number of these components may be collocated on the same computing device.

The client computing device 120 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 120 may include one or more of a keyboard, a mouse, a display 112, or a touch screen (of which display 112 may be a part of). For example, the client computing device 120 may be composed of hardware components like those of computing device 500 described below with respect to FIG. 6.

A graphical user interface 114 may be displayed to the user on the display 112. The graphical user interface 114 may be a web browser window, a client application window, an operating system window, an integrated development environment window, a virtual terminal window or other computer graphical user interface window. The graphical user interface 114 may be the interface of, or facilitate the use of, one or more computer programs on the client computing device. While a graphical user interface 114 is referred to, the subject innovations may be implemented using multiple graphical user interfaces.

The client computing device 120 may include a retention policy management client application 122. The retention policy management client application 122 may be used to modify a retention policy 132 stored on the data deletion management server 130. The retention policy management client application 122 may be a desktop or web client application which interacts with a retention policy management server application 132 on the data deletion management server 130 to modify the retention policy 132. The retention policy management client application may display a GUI 114 including user interface elements, selection or interaction with which may modify specific aspects of the retention policy 132, remove aspects of the retention policy 132, or add new aspects to the retention policy 132. For example, the displayed GUI 114 may include text box input elements where the user may enter values for particular textual properties of the retention policy, slider elements usable to select numerical values for particular numerical properties of the retention policy, and/or drop-down list or radio button elements for selecting values for properties of the retention policy, which may have one of a number of specific values.

Where the retention policy 132 is in a file format editable using a text editor, the retention policy management client application 122 may be a text editor. If the retention policy 132 is accessible by the text editor from the client computing device 122, e.g. via a network share or using networking functionality of the text editor, then the retention policy may be edited directly. Alternatively, the retention policy 132 may be downloaded from the data deletion management server 130 to the client computing device 120; the downloaded retention policy may be edited on the client computing device 120 using the text editor; then the edited retention policy may be transferred to the data deletion management server 130. The edited retention policy may then be used in place of the previous retention policy.

The client computing device 120 may also include a data deletion monitoring application 124. The data deletion monitoring application 124 may cause operational information descriptive of data deletion operations being performed by, or caused by, the data deletion management server 130, e.g. data deletion operations being performed by, or caused by a, data deletion coordinator 136. The operational information displayed may include the duration of one or more data deletion operations; the amount of data deleted by one or more deletion operations, either in terms of data size or number of data elements; the computational resources, e.g. memory and/or CPU usage; and/or statistics summarizing any of the preceding for a plurality of deletion operations, e.g. the mean and standard deviation of the amount of data deleted by the deletion operations occurring over a given time period, such as a day or an hour. The operational information may be displayed in numerical form and/or in graphical form. For example, a line graph showing the amount of data deleted each hour of the preceding week may be displayed.

The data deletion management server 130 may include one or more processors (e.g. CPUs), a network interface, and memory. The processor(s) is configured to execute computer instructions that are stored in one or more computer-readable media, for example, the memory of the respective server. The event monitoring server 130 includes a network interface that is configured to allow the server to transmit and receive data in one or more networks, e.g. a network connecting the event monitoring server 130, the distributed data storage 140 and the client computing device 120. The network interface may include one or more network interface cards (NICs). The memory of the server stores its respective data and instructions.

The data deletion management server 130 may include the retention policy 132. The retention policy 132 indicates which data is deletable, e.g. which data elements stored in a data store may be deleted. The retention policy may also be framed as indicating which data should be retained, e.g. which data elements stored in a data store should not be deleted. The retention policy 132 may facilitate the expression of which data is deletable and/or which data should be retained in an accessible and robust manner. The retention policy 132 may be expressed as or include code, e.g. mark-up language or programming language code. The code used to express or included in the retention policy 132 may be code in a policy expression language, e.g. policy expression language code. The policy expression language may be a domain specific language for the specification of the retention policies. The domain specific language may be adapted for and/or configured to be used for the specification of retention policies. The domain specific language may be a custom designed language or it may be a variant of a markup language, such as XML or YAML, having a specified format and/or fields containing certain data.

The retention policy 132 may contain several parts of policy expression language code. Each part of the policy expression language code may define one or more selectors to be applied to one or more datasets to determine which data in the one or more datasets is deletable. The selectors defined by each part of the policy expression language code may be applied cumulatively. For example, a selector defined by a first part of the policy expression language code may select a set of data elements in one or more datasets, then a selector defined by a second part of the policy expression language code may be used to select a subset of this set of data elements. If the selectors are applied cumulatively, then the same data elements are selected regardless of the order in which they are applied. The cumulative application of a number of selectors may correspond to finding the intersection between each of the sets of data elements which would be selected by each of the selectors from the one or more datasets, with the intersection operation being commutative and associative.

There may be several categories of selectors. The categories of selectors may include dataset selectors and transaction selectors. Where there are a plurality of datasets, dataset selectors select one or more of the plurality of datasets. Transaction selectors select particular transactions. Transactions may correspond to a particular modification to data in a given dataset, e.g. transactions may correspond to additions, modifications or deletions of data. These transactions may also correspond to a snapshot of the dataset as of a given date, time and/or version. Transactions may be the base element from which the one or more datasets are composed, e.g. each of the data elements forming the one or more datasets may be a transaction.

Dataset selectors may be of various types. Types of dataset selector may include a 'dataset identifier selector' type, a 'dataset folder selector' type, a 'dataset path selector' type, a 'derived dataset selector' type, a 'transforms dataset selector' type and an 'in-trash' dataset selector type.

A dataset identifier selector includes one or more dataset identifiers which may be used to select one or more of the plurality of datasets. A property of the dataset identifier selector may indicate whether it is a 'select' dataset identifier selector or an 'unselect' dataset identifier selector. A select dataset identifier selector selects the datasets specified by the one or more dataset identifiers. An unselect dataset identifier selector unselects the datasets specified by the one or more dataset identifiers, e.g. selects all datasets (other than those filtered out by a previously applied selector) except the dataset identifier specified by the one or more dataset identifiers.

A dataset folder selector includes one or more folder paths which may be used to select one or more of the plurality of datasets. A property of the dataset folder selector may indicate whether it is a 'select' dataset folder selector or an 'unselect' dataset folder selector. A select dataset folder selector selects the datasets contained in the one or more folders. An unselect dataset folder selector unselects the datasets contained in the one or more folders, e.g. selects all datasets (other than those filtered out by a previously applied selector) except the datasets contained in the one or more folders.

A dataset path selector includes one or more dataset paths which may be used to select datasets at each of the one or more paths specified. A property of the dataset path selector may indicate whether it is a 'select' dataset path selector or an 'unselect' dataset path selector. A select dataset path selector selects the datasets at each of the one or more paths. An unselect dataset path selector unselects the datasets at each of the one or more paths, e.g. selects all datasets (other than those filtered out by a previously applied selector) except each of the datasets at the one or more paths.

A derived dataset selector is used for selecting or unselecting derived datasets. The derived dataset selector may include an optional 'worker types' property. The worker types property may list one or more types of workers, e.g. types of processing operations or pipelines used to derive a dataset. Examples of worker types may include a transform worker type and a writeback worker type. A property of the derived dataset selector may indicate whether it is a 'select' derived dataset selector or an 'unselect' derived dataset selector. Derived datasets are datasets having a job specification and having a non-zero number of inputs so raw datasets and datasets ingested from an external source are not derived datasets. A job specification may be a mark-up language snippet or file, e.g. a JSON snippet, descriptive of operations, e.g. SQL and/or Python scripts to run, to transform one or more datasets. If the worker types property is empty, or is not specified, a select derived dataset selector selects all derived datasets (other than those filtered out by a previously applied selector). If the worker types property is specified, a select derived dataset selector selects datasets derived using one or more workers of one or more of the types of workers included in the worker types property. If the worker types property is empty or is not specified, an unselect derived dataset selector unselects all derived datasets e.g. selects all datasets (other than those filtered out by a previously applied selector) except derived datasets. If the worker types property is specified, a select derived dataset selector unselects datasets derived using one or more workers of one or more of the types of workers included in the worker types property. For example, it selects all datasets (other than those filtered out by a previous applied selector) except datasets derived using one or more workers of one or more of the types of workers included in the worker types property.

A transforms dataset selector is used for selecting or unselecting datasets produced using transforms. The transform dataset selector may include an optional 'transform types' property. The transform type property may list one or more transform types, e.g. types of transforms which may be used to derive a dataset. Examples of transform types may include a Python transform type or a JavaScript transform type. A property of the transforms dataset selector may indicate whether it is a 'select' transforms dataset selector or an 'unselect' transforms dataset selector. If the transforms types property is empty, or is not specified, a select derived dataset selector selects all datasets produced using transforms (other than those filtered out by a previously applied selector). If the transform types property is specified, a select derived dataset selector selects datasets derived using one or more transforms of the one or more of the transform types included in the transfer types property. If the transform types property is empty or is not specified, an unselect transforms dataset selector unselects all datasets produced using transforms, e.g. selects all datasets (other than those filtered out by a previously applied selector) except datasets produced using transforms. If the transform types property is specified, an unselect transforms dataset selector unselects datasets derived using one or more transforms of one or more of the types of transforms included in the transform types property, e.g. selects all datasets (other than those filtered out by a previous applied selector) except datasets produced using one or more transforms of one or more of the types of transforms included in the transform types property.

An in-trash dataset selector is used for selecting or unselecting datasets which have been trashed (e.g. soft deleted). A property of the in-trash dataset selector may indicate whether it is a 'select' in-trash dataset selector or an 'unselect' in-trash dataset selector. A select in-trash dataset selector selects the datasets which have been trashed. An unselect dataset path selector unselects the datasets which have been trashed, e.g. selects all datasets (other than those filtered out by a previously applied selector) except the datasets which have been trashed.

Transaction selectors may be of various types. Types of transaction selectors may include an 'is-aborted transaction selector' type, an 'is-older-than transaction selector' type, a 'transaction count selector' type, an 'is-not-in-branch transaction selector' type, an 'is-only-in-branch transaction selector' type, a 'view count transaction selector' type, an 'is-only-in-views-older-than transaction selector' type and a 'no-files-in-active-view transaction selector' type.

Several of the transaction selector types relate to branches. A branch is a variation of one or more datasets. The main branch of the dataset may be referred to as the 'master' branch. A new branch may originate at, e.g. branch off, at a given version and from a given branch of the one or more datasets. Transactions up until the given version of the given branch are common to the new branch and the given branch. Subsequent to the given version, different transactions may be applied to each of the new and the given branch without affecting the other of these branches.

Several of the transaction selector types relate to views. A view is a representation of a dataset as of a given time, date and/or version. To derive a view of a dataset, a set of transactions are applied either from the start or from a starting data set, e.g. a snapshot, to obtain a view of the dataset. Where snapshot transactions are used, a view of a dataset as of a given time, data or version may be obtained by beginning at the snapshot transaction prior to the given time, date or version, and applying all of the subsequent transactions up to the given time, date or version.

An is-aborted transaction selector selects transactions which have been aborted, e.g. transactions that were begun but have failed and/or been halted by a user or program.

An is-older-than transaction selector selects transactions which are older than a specified duration. The age of a transaction may be defined as the time elapsed between the time the transaction was closed and 'now', e.g. the time the retention policy is being used. The duration may be specified as a human readable duration, e.g. '5 h' may be used to represent 5 hours and '7d' may be used to represent 7 days.

A transaction count selector includes a 'number of transactions to retain' property. The transaction count selector selects, for deletion, all transactions (other than those filtered out by a previously applied selector) which are not one of the most recent 'number of transactions to retain' data containing transactions across any branch. A transaction is considered to be data-containing if it is committed and is not a delete transaction.

An is-not-in branch transaction selector selects all transaction (other than those filtered out by a previously applied selector) which are not included in a specified branch. The branch may be specified using a 'branch' property. Where temporary branches are created for development and testing purpose, it may be desirable to use an is-not-in-branch transaction selector to select, for deletion, all transactions which are not included in the main, or 'master', branch.

An is-only-in-branch transaction selector type selects transactions (other than those filtered out by a previously applied selector) which are only included in a given branch. The branch may be specified using a 'branch' property. Where a particular branch is designated for development and/or testing and is intended to be transient, it may be desirable to use an is-only-in-branch transaction selector to select, for deletion, transactions which are in that branch but have not been added to another branch, e.g. transactions that have not been merged into the master branch or also included in a persistent development branch.

A view count transaction selector includes a 'number of views to retain' property. The view count transaction selector selects, for deletion, all transactions (other than those filtered out by a previously applied selector) which are not used for generating the most recent 'number of views to retain' views. For example, where the 'number of views to retain' is one, all transactions prior to the latest snapshot transaction would be deleted.

An is-only-in-views-older-than transaction selector selects transactions which are only present in views older than a specified duration. The age of a transaction may be defined as the time elapsed between the close time of the latest transaction in the view and 'now', e.g. the time the retention policy is being used. The duration may be specified as a human readable duration, e.g. '5 h' may be used to represent 5 hours and '7d' may be used to represent 7 days.

A no-files-in-active-view transaction selector selects all transactions (other than those filtered out by a previously applied selector) which are not in the most recent view and all transactions (other than those filtered out by a previously applied selector) currently in the most recent view where the files in the transaction have been superseded by files in newer transactions.

The data deletion management server 130 may also include the retention policy management server application 134.

The retention policy management server application 132 may manage, e.g. edit and update, the retention policy 132. The retention policy management server application 132 may manage the retention policy 132 by receiving, from the retention policy management client application 122, one or more messages indicative of one or more desired changes to the retention policy 132, and then causing the retention policy 132 to be correspondingly updated. The one or more messages indicative of the one or more desired changes to the retention policy 132 may indicate changes to properties of one or more of the selectors of the retention policy 132, one or more new selectors to be added to the retention policy 132 and/or one or more selectors to be removed from the retention policy 132.

The retention policy management server application 132 may alternatively be or additionally include a storage server application which receives uploads and/or edits of the retention policy 132. The storage server application may be a file server application or a database application.

The data deletion coordinator 136 may evaluate data stored in the distributed data store 140 against the retention policy to determine which data stored in the distributed data store is deletable. The data deletion 136 coordinator may then delete or cause the deletion of at least some of the data which it determines to be deletable. To determine which data in the distributed data store is deletable and/or to delete or cause the deletion of at least some of the deletable data, the data deletion coordinator may perform one or more of the methods described in relation to FIGS. 2-5.

The data deletion coordinator 136 may also provide operational information descriptive of data deletion operations to the data deletion monitoring application 124 for analysis and/or display by the data deletion monitoring application 124. The operational information provided to the data deletion monitoring application 124 may include the duration of one or more data deletion operations; the amount of data deleted by one or more deletion operations, either in terms of data size or number of data elements; the computational resources, e.g. memory and/or CPU usage; and/or statistics summarizing any of the preceding for a plurality of deletion operations, e.g. the mean and standard deviation of the amount of data deleted by the deletion operations occurring over a given time period such as a day or an hour.

The distributed data store 140 may be any suitable distributed data store, e.g. any data store capable of the storage and retrieval of data elements across a plurality of devices. The distributed data store 140 may provide distributed data storage as a distributed key-value store, a distributed database and/or a distributed file storage system. For example, the distributed data store 140 may provide data storage using the Hadoop Distributed File System (HDFS) or the Amazon Simple Storage Service (S3). The distributed data store 140 may be implemented across a plurality of data store computing devices (142-1, 142-2, . . . , 142-N). Each of the data store computing devices may include a respective data store server application (144-1, 144-2, . . . , 144-N) to facilitate the provision of the distributed data store 140. Where the data store is provided using the Hadoop Distributed File System (HDFS), each of the respective data store server applications (144-1, 144-2, . . . , 144-N) may be one or more instances of the HDFS application. Where the data store is provided using Amazon S3, each of the respective data store server applications (144-1, 144-2, . . . 144-N) may be an Amazon S3 server application. Each data store computing device may include a respective data store partition (146-1, 146-2, . . . , 146-N) containing respective data elements (148-1, 148-2, . . . , 148-N). The data elements may be transactions as defined above.

Deletable Data Element Deletion Method

Figure 2:
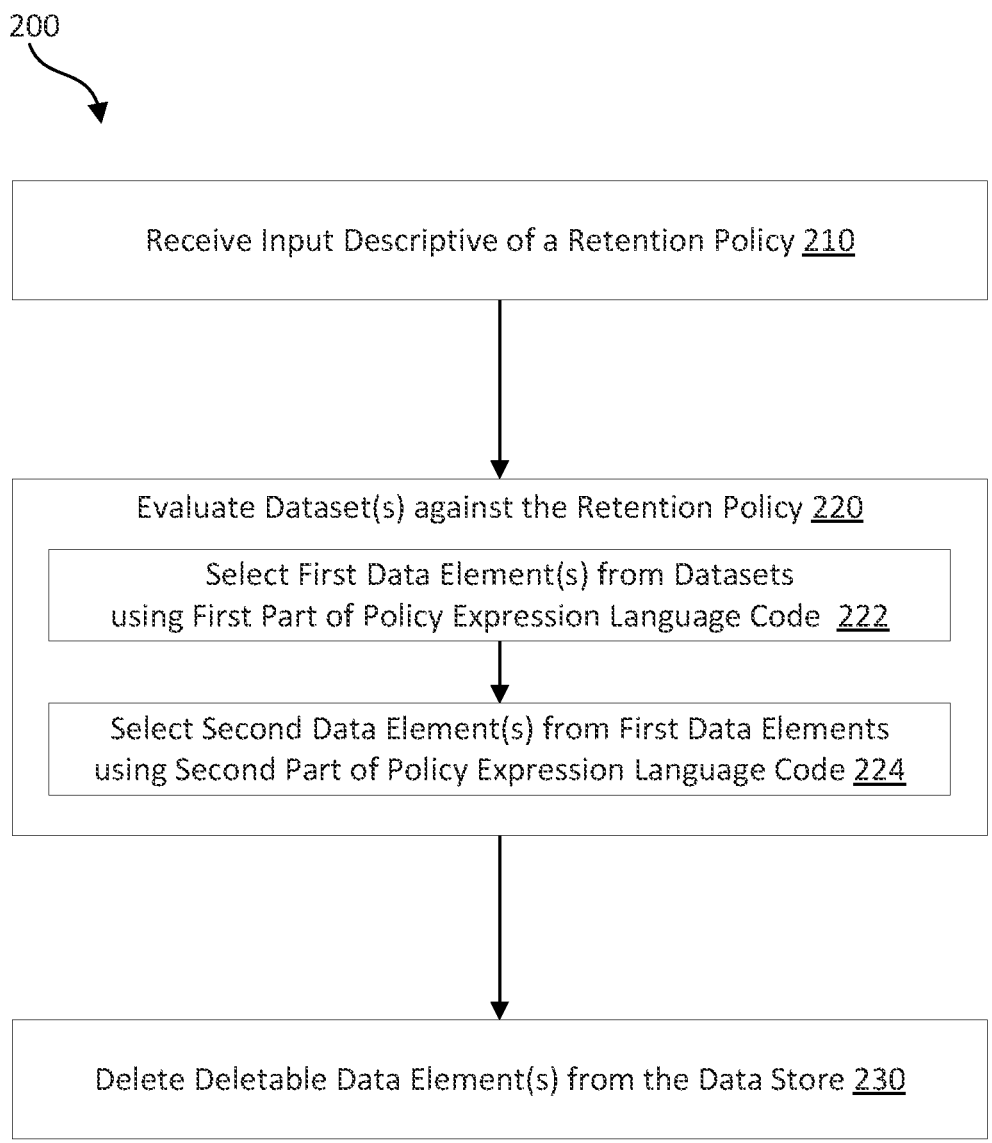
FIG. 2 is a flow diagram illustrating an example method for deleting deletable data elements using a retention policy, in accordance with example embodiments.

FIG. 2 is a flowchart illustrating an example method 200 by which deletable data elements may be deleted using a retention policy. The method 200 is performed by computer-readable instructions, e.g. software, for execution by one or more processors of one or more computing devices (e.g., the basic computing device 500 of FIG. 6). In one embodiment, the one or more computing devices are one or more data deletion management servers, e.g. data deletion management server 130 of computer system 100. The computer-readable instructions may be or be a component of data deletion coordinator software, e.g. data deletion coordinator 136. The data deletion coordinator software may be any number of and/or any combination of sequences of instructions, interpretable code, loadable modules, dynamic link libraries and/or computer programs.

At step 210, input descriptive of a retention policy is received. The input descriptive of the retention policy may be received from storage, memory or another process on the computing device executing the method 200, or may be received from another device networked (directly or indirectly) with the computing device executing the method 200.

The input descriptive of the retention policy may be received using any suitable mechanism. The input descriptive of the retention policy may be received by retrieving the input descriptive of the retention policy from a file system and/or memory of the computing device executing the method 200. Alternatively or additionally, the input descriptive of the retention policy may be received via any or any combination of: a remote service call; an application programming interface (API) call; an internal networking protocol; a file sharing protocol or service; and/or memory or persistent storage shared between the computing device executing the method 200 and another computing device storing the input descriptive of the retention policy.

The input descriptive of the retention policy may be a retention policy, e.g. the retention policy 132 of computer system 100. The input descriptive of the retention policy may alternatively be or additionally include a representation of the retention policy, such as a transformation, interpretation or compilation of the retention policy.

The retention policy indicates which data is deletable, e.g. which data elements stored in a data store may be deleted. The retention policy may also be framed as indicating which data should be retained, e.g. which data element stored in a data store should not be deleted. The retention policy may facilitate the expression of which data is deletable and/or which data should be retained in an accessible and robust manner. The retention policy may be expressed as or include code, e.g. mark-up language or programming language code. The code used to express or included in the retention policy may be code in a policy expression language, e.g. policy expression language code. The policy expression language may be a domain specific language for the specification of the retention policies. The domain specific language may be adapted for and/or configured to be used for the specification of retention policies. The domain specific language may be a custom designed language or it may be a variant of a markup language, such as XML or YAML, having a specified format and/or fields containing certain data. The retention policy may alternatively or additionally take any of the forms described with respect to the retention policy 132 of computer system 100.

At step 220, one or more datasets are evaluated against the retention policy to determine one or more deletable data elements in the one or more datasets. The one or more datasets may include a plurality of data elements and each of the plurality of data elements may be a transaction. A transaction may correspond to a particular modification to data in the respective dataset, e.g. transactions may correspond to additions, modifications or deletions of data. A transaction may also correspond to a snapshot of the respective dataset as of a given date, time and/or version. The retention policy may include policy expression language code. Data elements by evaluating their metadata and/or data against criteria set out in the retention policy.

Where the retention policy includes several parts of policy expression code, evaluating the retention policy against the retention policy includes evaluating data elements against each of these parts of policy expression language code to determine which data elements in the one or more datasets are deletable. The parts of policy expression language code may be applied cumulatively to determine which data elements are deletable. Cumulatively applying the parts of the policy expression language code may include a first selection step 222 and a second selection step 224.

At step 222, a first one or more data elements are selected from the one or more datasets using a first part of the policy expression language code. The first part of the policy expression language code may include any of the selectors described above, e.g. any type of transaction selector or dataset selector described above in relation to the retention policy 132.

At step 224, a second one or more data elements are selected from the first one or more data elements using a second part of the policy expression language code. The second part of the policy expression language code may include any of the selectors described above, e.g. any type of transaction selector or dataset selector described above in relation to the retention policy 132.

The first one or more data elements may be selected from a plurality of datasets, the first part of the policy expression language code may include a dataset selector, and the selected first one or more data elements may be the data elements in the one or more datasets of the plurality of datasets selected using the dataset selector. The second part of the policy expression language code may include a transaction selector and the selected second one or more data elements may be the transactions selected, from the one or more datasets, by the transaction selector.

The one or more deletable data elements may be the second one or more data elements. The one or more deletable data elements may be a subset of the second one or more data elements. Further selection operations may be applied to the second one or more data elements, e.g. by further parts of policy expression language code and/or by default deletion criteria, and the one or more deletable data elements may be the subset of the second one or more data elements selected by these further selection operations.

At step 230, the one or more deletable data elements are deleted from a data store. The data store may be the distributed data store 140 of computer system 100. The one or more deletable data elements may be hard deleted, e.g. permanently deleted, from the data store. Hard deletion may reduce the storage capacity of the data store used by the one or more deletable data elements. The deletion of the one or more deletable data elements from the data store may include a variation or combination of any of the methods described in relation to FIGS. 3-5.

Marked Data Element Deletion Method

Figure 3:
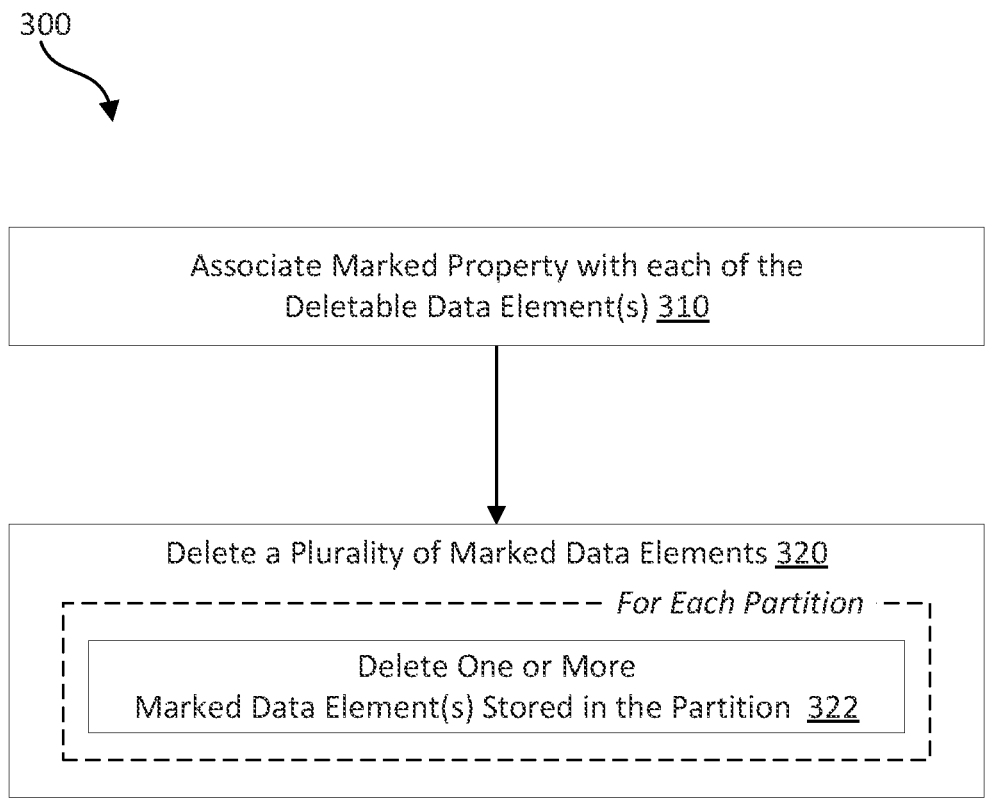
FIG. 3 is a flow diagram illustrating an example method for deleting marked data elements, in accordance with example embodiments.

FIG. 3 is a flowchart illustrating an example method 300 by which data elements may be marked for deletion and subsequently deleted. The method 300 is performed by computer-readable instructions, e.g. software, for execution by one or more processors of one or more computing devices (e.g., the basic computing device 500 of FIG. 6). In one embodiment, the one or more computing devices are one or more data deletion management servers, e.g. data deletion management server 130 of computer system 100. The computer-readable instructions may be or be a component of data deletion coordinator software, e.g. data deletion coordinator 136. The data deletion coordinator software may be any number of and/or any combination of sequences of instructions, interpretable code, loadable modules, dynamic link libraries and/or computer programs.

At step 310, a marked property is associated with each of one or more deletable data elements. The marked property indicates that the respective data element is deletable. The marked property may be associated with each of the one or more deletable data elements using any suitable mechanism. Examples of suitable mechanisms include, but are not limited to, adding the marked property to the respective data element, adding the marked property to metadata for the respective data element, adding an identifier of the respective data element to a database table, adding an identifier of the respective data element to a file listing marked data elements and adding an identifier of the respective data element to a collection data structure.

At step 320, a plurality of marked data elements are deleted from a data store, e.g. the distributed data store 140 of computer system 100. The plurality of marked data elements are associated with the marked property. The plurality of marked data elements include the one or more deletable data elements associated with the marked property in step 310. The plurality of marked data elements may also include other data elements, e.g. data elements marked prior to step 310. The deletion of the plurality of marked data elements may be performed using a plurality of coroutines, threads and/or processes, or any other suitable mechanism for the parallel performance of deletion operations. Where the deletion of the plurality of marked data elements is performed using a plurality of coroutines, the plurality of coroutines may be coroutines provided by the coroutines functionality of the Kotlin programming language and/or the kotlinx.coroutines library.

Where the plurality of marked data elements are stored in a distributed data store having a plurality of partitions, e.g. the partitions 146-1-146-N of the distributed data store 140, a deletion step 322 may be executed for each of a plurality of partitions in the distributed data store. The deletion step 322 may delete a respective set of one or more marked data elements of the plurality of marked data elements. The respective set of one more marked data elements may be the one or more marked data elements of the plurality of marked data elements stored on the respective partition. Each of the sets of one or more marked data elements may be constrained from having more than a certain number of elements. Constraining the size of the sets of the one or more marked data elements may limit the maximum computational load on the data store computing device providing the respective partition of the distributed data store. Limiting the maximum computational load on a given data store computing devices may reduce the likelihood that the respective data store computing devices malfunctions or performs suboptimally due to excessive computational load. Constraining the size of the sets of the one or more marked data elements also facilitates the distribution of deletions across a plurality of partitions of a distributed data store. Distributing the deletions across a plurality of partitions may improve horizontal scalability.

Largest Marked Data Element Deletion Method

Figure 4:
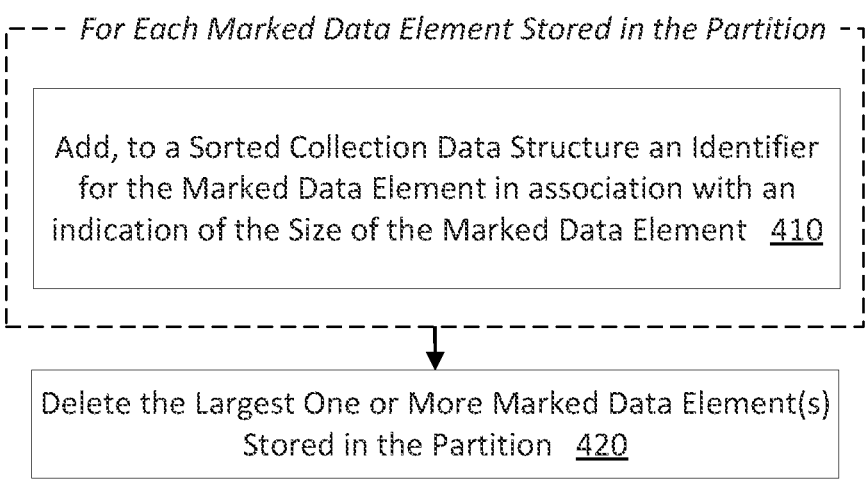
FIG. 4 is a flow diagram illustrating an example method for deleting the largest marked data elements stored in a partition, in accordance with example embodiments.

FIG. 4 is a flowchart illustrating an example implementation of step 322 of method 300. The illustrated implementation of step 322 illustrated provides a method by which the largest marked data elements stored in a partition may be deleted, e.g. the respective set of one or more marked data elements for the partition are the largest one or more marked data elements stored in the partition. Deleting the largest one or more marked data elements stored in the partition may facilitate more efficient use of computing resources for deletions. At least part of the computational cost of deleting a data element may not be dependent on the size of the data element, e.g. may be fixed for all data elements regardless of their size, so deleting the largest one or more marked data elements may facilitate deleting more data, e.g. deleting more bytes from data storage, using a given amount of computing resources.

The step 410 of the illustrated implementation is performed for each marked data element stored in the partition. Step 410 adds an identifier of the given marked data element to a sorted data collection structure in association with an indication of the size of the marked data element. The identifier of the given marked data element may be added in association with the indication of the size of the marked data element by adding a data container including the identifier and indication of the size to the sorted collection data structure. Examples of suitable data containers include tuples and objects. The sorted collection data structure is sorted based on the indications of the size of the marked data elements included in the sorted collection data structure. The sorted collection data structure may be a tree set. The tree set data structure is a data structure suited for efficiently maintaining the order of data as new elements are added and/or removed. A tree set data structure may be implemented using a red-black tree. The computational cost of adding an element to a red-black tree (in the correct location) increases logarithmically with the number of data elements contained in the red-black tree.

The step 420 of the illustrated implementation deletes the largest one or more marked data elements stored in the partition. The largest one or more marked data elements stored in the partition may be determined using the sorted data collection structure. The identifiers for the largest one or more marked data elements, e.g. the largest K data elements, may be read from the sorted collection data structure. As the sorted collection data structure maintains the identifiers of the data elements ordered according to the indication of the size of the data elements, the largest one or more data elements stored in the partition may be determined without further processing or at least without substantial further processing.

Deletion Reattempting Method

Figure 5:
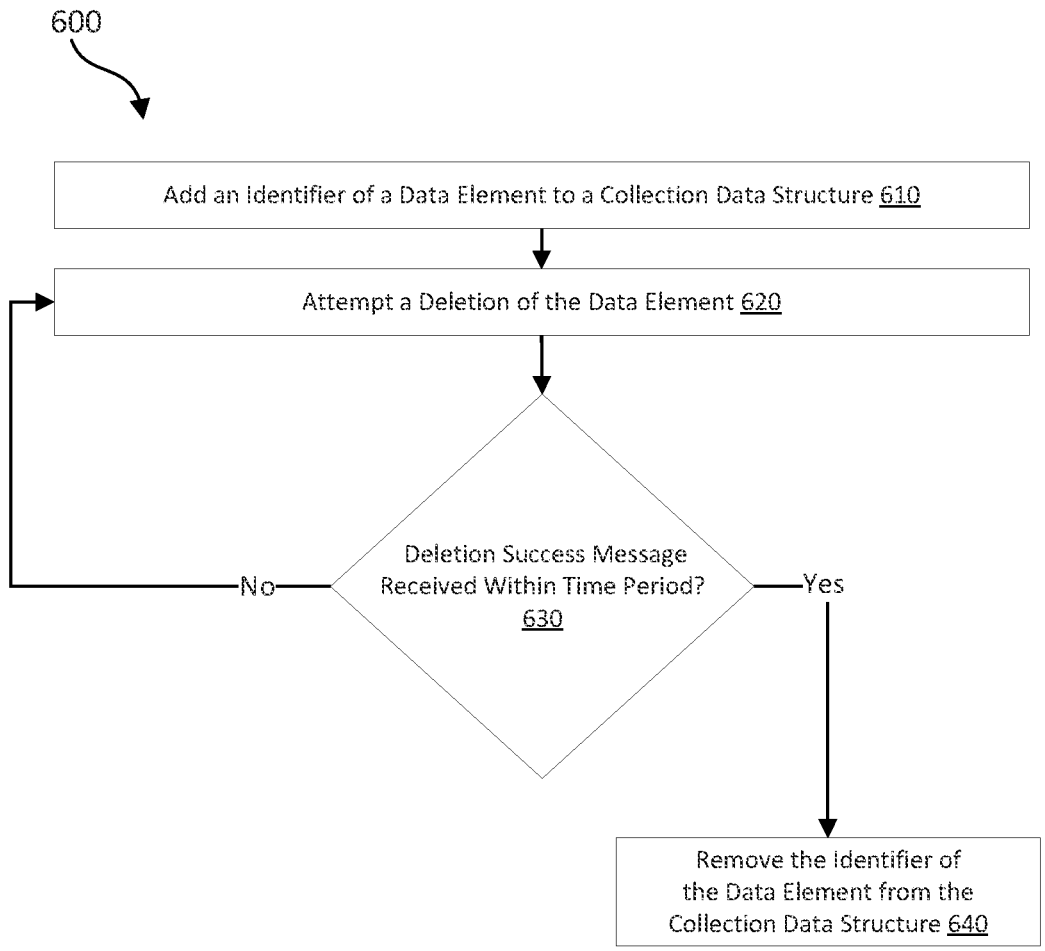
FIG. 5 is a flow diagram illustrating an example method for reattempting the deletion of data elements, in accordance with example embodiments.

FIG. 5 is a flowchart illustrating an example method 600 by which the deletion of data elements may be reattempted, e.g. on failure or seeming failure of one or more deletion operations. The method 600 is performed by computer-readable instructions, e.g. software, for execution by one or more processors of one or more computing devices (e.g., the basic computing device 500 of FIG. 6). In one embodiment, the one or more computing devices are one or more data deletion management servers, e.g. data deletion management server 130 of computer system 100. The computer-readable instructions may be or be a component of data deletion coordinator software, e.g. data deletion coordinator 136. The data deletion coordinator software may be any number of and/or any combination of sequences of instructions, interpretable code, loadable modules, dynamic link libraries and/or computer programs.

At step 610, an identifier of a data element to be deleted is added to a collection data structure. Examples of suitable collection data structures include, but are not limited to, list, tree, array, stack, queue and set data structures. In addition to the identifier of the data element, the collection data structure may include identifiers of other data elements which are to be deleted.

At step 620, an attempt to delete the data element is made. The time at which the attempt to delete the data element is made may be recorded. The time at which the attempt is made may be recorded in the collection data structure with the identifier of the data element or may be recorded in another suitable data structure. The deletion of the data element may be an idempotent operation. An idempotent operation is an operation where performing the operation multiple times has the same effect as performing the operation once. Idempotent operations may be repeated multiple times without consequence. Where the deletion operation is idempotent, the deletion operation may be performed again without consequence even when the data element has been deleted already.

At step 630, it is determined whether a message indicating the success of the deletion attempt has been received within a given time period. The determination may be made using the current time, the given time period and the time at which the deletion attempt is made. The given time period may be fixed, may vary according to the properties of the data element and/or may vary according to the number of attempts made. For example, a back-off strategy may be employed where the given time period increases for each attempt at deleting the data element for which a message indicating success is not received. If the message indicating the success of the deletion has not been received with the given time period, the identifier of the data element remains in the collection data structure and, step 620 is performed again, e.g. the deletion of the data element is reattempted. The success message may not have been received for reasons other than the failure of the deletion operation, e.g. due to a failure of the messaging mechanism, and the previous deletion attempt may have been successful so, in this instance, the deletion operation may be 'performed' multiple times but, if the deletion operation is idempotent, this does not have negative consequences. If the message indicating the success of the deletion attempt has been received within the given time period, step 640 is performed.

At step 640, the identifier of the data element is removed, e.g. deleted, from the collection data structure. After the identifier of the data element is removed from the collection data structure, the deletion of the data element is not attempted. Deletion attempts may continue with attempts to delete other data elements identified by identifiers remaining in the collection data structure.

Basic Computing Device

Figure 6:
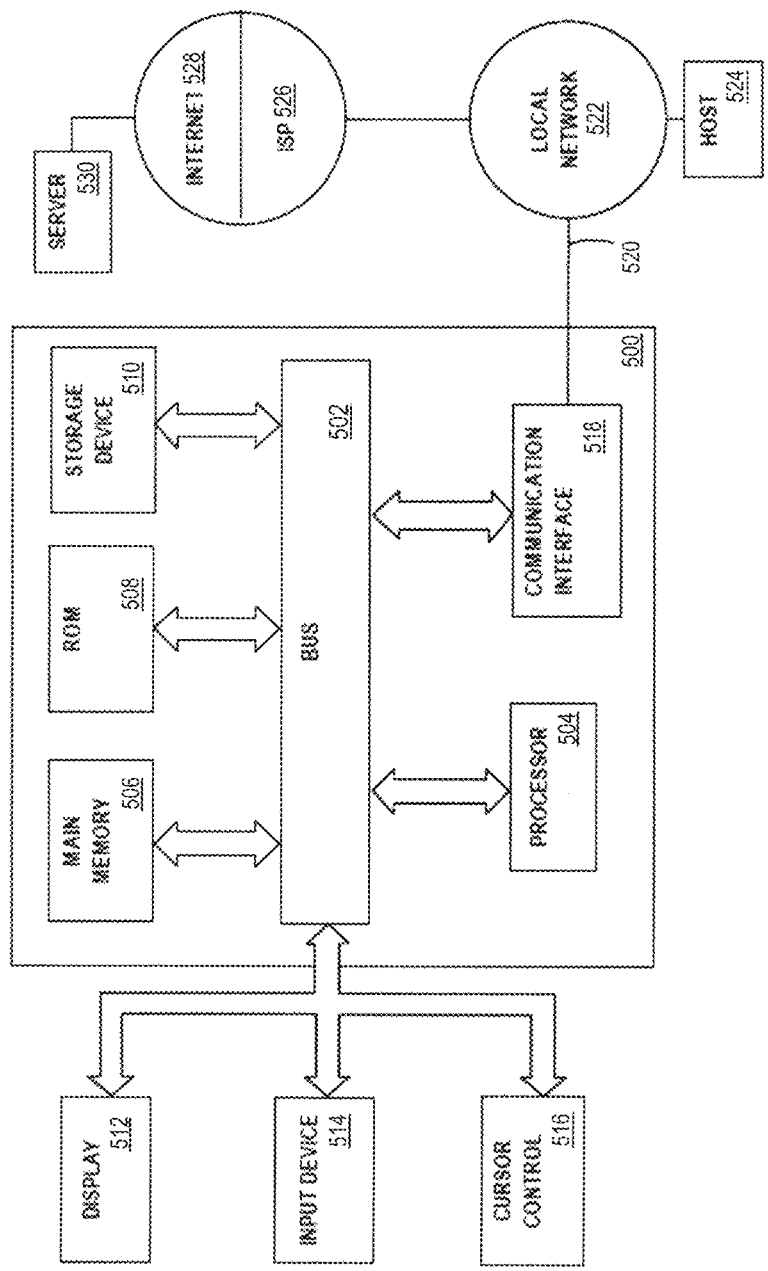
FIG. 6 is a schematic diagram of a computing device in which software-implemented processes of the example embodiments may be embodied.

Referring now to FIG. 6, it is a block diagram that illustrates a basic computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (e.g. peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described basic computer hardware is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method, performed by one or more processors, comprising:
    receiving input descriptive of a retention policy, the input descriptive of the retention policy including policy expression language code, a first part of the policy expression language code including one or more dataset selectors, and a second part of the policy expression language code including one or more transaction selectors;
    evaluating one or more datasets against the retention policy to determine one or more deletable data elements in the one or more datasets by at least:
        applying the policy expression language code of the input descriptive of the retention policy to the one or more datasets;
        generating a plurality of marked data elements from the one or more datasets based on the retention policy; and
        selecting the one or more deletable data elements from the plurality of marked data elements based on a size of each data element of the plurality of marked data elements, wherein the one or more deletable data elements include a first marked data element and the one or more deletable data elements do not include a second marked data element, wherein a first computational cost for deleting the first marked data element is equal to a second computational cost for deleting the second marked data element, and wherein the first marked data element is larger than the second marked data element in size; and
    deleting the one or more deletable data elements from a data store.

2. The method of claim 1, wherein each marked data element of the plurality of marked data elements is associated with a marked property and includes a data element, the marked property indicating that the data element is deletable.

3. The method of claim 1, wherein the deleting the one or more deletable data elements from a data store includes, for each partition of a plurality of partitions of the data store:
    deleting, from a respective partition, a respective set of the one or more deletable data elements, wherein the respective set of the one or more deletable data elements are stored on the respective partition prior to deletion.

4. The method of claim 1, wherein the one or more transaction selectors correspond to additions, modifications, or deletions of data.

5. The method of claim 1, wherein the one or more dataset selectors include a dataset folder selector, a dataset path selector, a derived dataset selector, a transform dataset selector, or an in-trash dataset selector.

6. The method of claim 5, wherein the one or more dataset selectors includes the transform dataset selector, and wherein the transform dataset selector is configured for selecting or unselecting datasets produced using one or more transforms.

7. The method of claim 1, wherein the one or more transaction selectors include a transaction selector type related to branches of the one or more datasets or views of the one or more datasets.

8. The method of claim 1, wherein the one or more transaction selectors include at least one selected from a group consisting of an is-aborted transaction selector, an is-older-than transaction selector, a transaction count selector, an is-not-in-branch transaction selector, an is-only-in-branch transaction selector, a view count transaction selector, an is-only-in-views-older-than transaction selector, and a no-files-in-active-view transaction selector.

9. A system comprising:
one or more processors; and
one or more memories storing instructions that, when executed by the one or more processors, cause the system to perform a set of operations, the set of operations comprising:
receiving input descriptive of a retention policy, the input descriptive of the retention policy including policy expression language code, a first part of the policy expression language code including one or more dataset selectors, and a second part of the policy expression language code including one or more transaction selectors;
evaluating one or more datasets against the retention policy to determine one or more deletable data elements in the one or more datasets by at least:
applying the policy expression language code of the input descriptive of the retention policy to the one or more datasets;
generating a plurality of marked data elements from the one or more datasets based on the retention policy; and
selecting the one or more deletable data elements from the plurality of marked data elements based on a size of each data element of the plurality of marked data elements, wherein the one or more deletable data elements include a first marked data element and the one or more deletable data elements do not include a second marked data element, wherein a first computational cost for deleting the first marked data element is equal to a second computational cost for deleting the second marked data element, and wherein the first marked data element is larger than the second marked data element in size; and
deleting the one or more deletable data elements from a data store.

10. The system of claim 9, wherein each marked data element of the plurality of marked data elements is associated with a marked property and includes a data element, the marked property indicating that the data element is deletable.

11. The system of claim 9, wherein the deleting the one or more deletable data elements from a data store includes, for each partition of a plurality of partitions of the data store:
deleting, from a respective partition, a respective set of the one or more deletable data elements, wherein the respective set of the one or more deletable data elements are stored on the respective partition prior to deletion.

12. The system of claim 9, wherein the one or more transaction selectors correspond to additions, modifications, or deletions of data.

13. The system of claim 9, wherein the one or more dataset selectors include at least one selected from a group consisting of a dataset folder selector, a dataset path selector, a derived dataset selector, a transform dataset selector, and an in-trash dataset selector.

14. The system of claim 13, wherein the one or more dataset selectors include the transform dataset selector, and wherein the transform dataset selector is configured for selecting or unselecting datasets produced using one or more transforms.

15. The system of claim 9, wherein the one or more transaction selectors include a transaction selector type related to branches of the one or more datasets or views of the one or more datasets.

16. A method, performed by one or more processors, comprising:
receiving input descriptive of a retention policy, the input including one or more dataset selectors and one or more transaction selectors, and the one or more transaction selectors including a transaction selector type related to branches of one or more datasets or views of the one or more datasets;
evaluating the one or more datasets against the retention policy to determine one or more deletable data elements in the one or more datasets by at least:
generating a plurality of marked data elements from the one or more datasets based on the retention policy; and
selecting the one or more deletable data elements from the plurality of marked data elements based on a size of each data element of the plurality of marked data elements, wherein the one or more deletable data elements include a first marked data element and the one or more deletable data elements do not include a second marked data element, wherein a first computational cost for deleting the first marked data element is equal to a second computational cost for deleting the second marked data element, and wherein the first marked data element is larger than the second marked data element in size; and
deleting the one or more deletable data elements from a data store.

17. The method of claim 16, wherein the input descriptive of the retention policy includes policy expression language code, a first part of the policy expression language code includes the one or more dataset selectors, and a second part of the policy expression language code includes the one or more transaction selectors.

18. The method of claim 16, wherein the one or more transaction selectors correspond to additions, modifications, or deletions of data.

19. The method of claim 16, wherein the one or more dataset selectors include at least one selected from a group consisting of a dataset folder selector, a dataset path selector, a derived dataset selector, a transform dataset selector, and an in-trash dataset selector.

20. The method of claim 19, wherein the one or more dataset selectors includes the transform dataset selector, and wherein the transform dataset selector is configured for selecting or unselecting datasets produced using one or more transforms.

* * * * *